US012110708B2

(12) United States Patent
Benna

(10) Patent No.: US 12,110,708 B2
(45) Date of Patent: Oct. 8, 2024

(54) WIRELESS POOL WATER LEVEL MONITOR AND WATER FILLER

(71) Applicant: Gary Benna, Tucson, AZ (US)

(72) Inventor: Gary Benna, Tucson, AZ (US)

( * ) Notice: Subject to any disclaimer, the term of this patent is extended or adjusted under 35 U.S.C. 154(b) by 122 days.

(21) Appl. No.: 18/088,025

(22) Filed: Dec. 23, 2022

(65) Prior Publication Data

US 2024/0209650 A1 Jun. 27, 2024

(51) Int. Cl.

*E04H 4/14* (2006.01)
*G08C 17/00* (2006.01)
*G08C 17/02* (2006.01)
*H01C 10/02* (2006.01)

(52) U.S. Cl.

CPC ............... *E04H 4/148* (2013.01); *E04H 4/14* (2013.01); *G08C 17/00* (2013.01); *G08C 17/02* (2013.01); *H01C 10/02* (2013.01); *G08C 2201/93* (2013.01)

(58) Field of Classification Search

CPC .. E04H 4/14; E04H 4/148; E04H 4/12; G08C 17/00; G08C 17/02; G08C 2201/93; H01C 10/02
USPC ...................................................... 4/508, 496
See application file for complete search history.

(56) References Cited

U.S. PATENT DOCUMENTS 4,592,098 A * 6/1986 Magnes .................... E04H 4/12
4/508
5,247,710 A * 9/1993 Carder ...................... E04H 4/12
4/508
5,616,239 A * 4/1997 Wendell ................ E04H 4/1209
4/508
5,878,447 A * 3/1999 Mogab ...................... E04H 4/12
4/508

FOREIGN PATENT DOCUMENTS

WO WO-0102675 A1 * 1/2001 ............... E04H 4/12

* cited by examiner

*Primary Examiner* — Tuan N Nguyen
(74) *Attorney, Agent, or Firm* — Eugene Vamos

(57) ABSTRACT

The Wireless Pool Water Level Monitor and Water Filler is a device that maintains the water level in a pool between predetermined limits: an upper limit and a lower limit. The device comprises a sensor system, and a valve actuation system. The sensor system monitors the water level of the pool. The valve actuation system controls the water flow into the pool. The device may further comprise a mobile app and a main broker server. The mobile app remotely monitors the data gathered by the sensor system and remotely controls the valve actuation system and the water flow to the pool. The main broker server stores the data gathered from the monitoring of the water level of the pool.

14 Claims, 8 Drawing Sheets

WIRELESS POOL WATER LEVEL MONITOR AND WATER FILLER

CROSS-REFERENCE TO RELATED APPLICATIONS

Not Applicable

STATEMENT REGARDING FEDERALLY SPONSORED RESEARCH/DEVELOPMENT

Not Applicable

THE NAMES OF THE PARTIES TO A JOINT RESEARCH AGREEMENT

Not Applicable

REFERENCE TO A "SEQUENCE LISTING," A TABLE, OR A COMPUTER PROGRAM

Not Applicable

STATEMENT REGARDING PRIOR DISCLOSURES BY AN INVENTOR OR JOINT INVENTOR

Not Applicable

BACKGROUND OF THE INVENTION

1 Field of Invention

The device is applicable to liquid containers in need of continuous liquid level monitoring and filling. As an example, this device relates to a swimming pool water level monitor and filler. This device minimizes expenses caused by low water levels (e.g., pool water circulation pump burn out), high water levels (e.g., water overfill), other pool equipment malfunctioning, water chemistry imbalances, and other damage caused by misuse.

2 Issue Statement

Most swimming pool designs include a skimmer that is reached through a rectangular access hole cut into the side of the pool from a few inches below to a few inches above the water level of the pool. This access hole leads to the chamber of the skimmer; a suction tube is located at the bottom of the chamber. The chamber of the skimmer is accessed through a top opening located on the deck surrounding the pool. This top opening often has a lid. Suction is created by a pool water circulation pump which filters the water through the suction tube, returning the filtered water to the pool. If the water in the pool drops below the lower level of the access hole in the side of the pool, air will be sucked into the pool water circulation pump, causing the pump to burn out and to be subject to costly repairs.

Water loses produced by evaporation and structural defects (e.g., cracks, holes) allow the water level of the pool to drop below the lower level of the access hole in the side of the pool, forcing pool users to maintain water levels within operational limits—between an upper limit water level (94) and a lower limit water level (96)—by cumbersome and unreliable methods.

3 Prior Art

Many pool users maintain the water level (92) of a pool within predetermined water level operational limits—between an upper limit water level (94) and a lower limit water level (96)—by filling the pool with a hose from time to time. When the user is away from the pool, a surrogate in the form of a neighbor, house sitter, pool service, or other is tasked to fill the pool and keep it within these operational limits. A hose is normally stretched from a faucet to the pool side, creating a blight and a safety hazard. This manual solution is prone to human error; either an opened faucet is forgotten, leading to pool over-filling, water loss, and increased water bills or the faucet is never opened, leading to pool water circulation pump burn out.

Automated devices have been developed to address these deficiencies, but these automated devices have their own short comings.

Floats. Mechanical floats are used as sensor triggers for upper and lower water limit levels. However, mechanical floats are prone to corrosion, misalignment, and mechanical failure. In many instances, these mechanical floats are integrated within the pool level sensors and not readily or easily diagnosed when they mechanically or structurally fail.

Timers. Mechanical and digital timers are used to control the water flow, but the computation of optimal fill times is complicated by varying water pressure and hose sizes. Furthermore, timers do not consider fluctuations in water evaporation rates (e.g., temperature, pressure, humidity).

Capacitance Potentiometers. Low current electrical probes are positioned to determine how much electricity flows between the probes depending on the amount of water touching the probes. Potentiometer readings are used to turn on and off a water valve. A short and long positive probe with a long neutral probe can be used to detect upper and lower limit water levels. When the water reaches an upper or lower-level limit, a valve turns on/off accordingly. These capacitance potentiometers can become corroded and calcified causing malfunctions. In many instances, these capacitance potentiometers depend on electrical and communication lines; running these lines can be costly and time consuming. Capacitance potentiometers allow for continuous water level measurement, but they are prone to corrosion exacerbated by chemicals poured into the pools. Potentiometer readings are affected by water temperature, since water conductivity is a function of water temperature. If these potentiometer readings are not corrected for temperature, the readings will not be accurate.

Proximity sensors. Proximity sensors provide an improved device for water level sensing but depend on a microprocessor for interpretation and communication with the valve. These sensors, processors, and communication devices depend on electrical power. Running electrical lines can, as noted, be costly and time consuming.

Baffles. Baffles provide a mechanical means to control the water flow, but they are prone to malfunction.

Mounting Positions. Automated devices that control pool water levels are normally mounted on a side wall of the pool. However, the installation of these devices is cumbersome as it requires electrical tools, is time consuming, and is subject to poor or incorrect installation leading to improper device readings.

RF Transmission. Many devices rely on traditional RF transmission protocols, which are prone to noise and interference from other RF units; many wireless home devices depend on RF communications (lights, fans, garage doors) operating on the same frequency band. This frequency overlap opens the possibility that using one of these wireless home devices can inadvertently activate another device. For example, when your neighbor opens the garage door, the pool filler may turn on or off with no knowledge to the pool user. Furthermore, the physical location between RF communication nodes relies on line-of-site topography, complicating the positioning of the devices.

Battery Power. Many of these pool filler devices are battery powered, necessitating frequent replacement. This need for frequent replacement leads to inadvertent device down time and the ensuing consequences.

Device Feedback to User. None of these prior pool filler devices provide feedback and ready information access to the pool user as to the pool water level and the functioning of the pool filler device. Furthermore, these pool filler devices do not provide for a method for the pool user to fill the pool remotely and manually.

LevelSmart by Kona Labs exemplifies many of these shortcomings. The communication between the pool sensor and the home unit that controls the water flow relies on traditional RF protocols, forcing the equipment to be situated in line of sight. Furthermore, the water level is determined by a potentiometer. The ending point of the water fill cycle is determined by a timer rather than an actual measurement of pool water level. The thermometer that adjusts and calibrates the operation of the device is based on air temperature not water temperature, an assumption that provides for measurement uncertainty.

BRIEF SUMMARY OF THE INVENTION

The Wireless Pool Water Level Monitor and Water Filler (100) is a device that maintains the water level (92) in a liquid container (e.g., a pool) between predetermined water level operational limits: an upper limit water level (94) and a lower limit water level (96).

The Wireless Pool Water Level Monitor and Water Filler (100) comprises two hardware elements: a sensor system (200) and a valve actuation system (400). The Wireless Pool Water Level Monitor and Water Filler (100) may further comprise a first software element: a main broker server (600). The Wireless Pool Water Level Monitor and Water Filler (100) may further comprise a second software element: a mobile app (700).

The sensor system (200) monitors the water level (92) and the temperature of the pool. The sensor system (200) communicates with the main broker server (600). The sensor system (200) transmits data to the main broker server (600). The sensor system (200) receives data from the main broker server (600). FIG. 1 shows the sensor system (200).

The valve actuation system (400) controls the water flow into the pool. The valve actuation system (400) communicates with the main broker server (600). The valve actuation system (400) transmits data to the main broker server (600). The valve actuation system (400) receives data from the main broker server (600) that is used by the valve actuation system (400) to control the water flow into the pool. FIG. 2 shows the valve actuation system (400).

The mobile app (700) allows for the remote monitoring and remote controlling of the water level (92) of the pool. The mobile app (700) communicates with the main broker server (600). The mobile app (700) receives data from the main broker server (600), allowing for remote monitoring. The mobile app (700) transmits data to the main broker server (600) that is used by the valve actuation system (400) to control the water flow, allowing for remote controlling of the water level (92) of the pool.

The visualization system (460) of the valve actuation system (400) communicates with the mobile app (700). The mobile app (700) receives data from the visualization system (460) of the valve actuation system (400), allowing for remote monitoring. The visualization system (460) of the valve actuation system (400) communicates with the mobile app (700) through a wireless access point (800) via wireless communication using the Wi-Fi protocol and via the Internet.

The sensor system (200), the valve actuation system (400), and the mobile app (700) are identified as remote devices (110). FIG. 5 shows a data communication flow chart between the remote devices (110) and the main broker server (600).

The main broker server (600) communicates with the remote devices (110). The main broker server (600) receives data from the remote devices (110). The main broker server (600) transmits data to the remote devices (110). The main broker server (600) serves as a data communication hub to the remote devices (110), enabling the flow of data between the remote devices (110). The main broker server (600) stores data from the remote devices (110). The main broker server (600) allows for the communication between remote devices (110) to stop the water flow into the pool or to start the water flow into the pool. The main broker server (600) resides at a remote location—the cloud—and accessed through the Internet.

The sensor system (200) and the valve actuation system (400) communicate with the main broker server (600) through a wireless access point (800) via wireless communication using the Wi-Fi protocol and via the Internet. From the sensor system (200) and the valve actuation system (400), data is transmitted through the wireless access point (800) and the Internet to arrive at the main broker server (600). From the main broker server (600), data is transmitted through the Internet and the wireless access point (800) to the sensor system (200) and the valve actuation system (400).

The mobile app (700) communicates with the main broker server (600) through a variety of state-of-the-art mediums (wired communication, wireless communication (Wi-Fi, cellular, Bluetooth)) and the Internet, transmitting data to the main broker server (600) and receiving data from the main broker server (600).

DEFINITIONS

Data communication is the transfer and reception of data in the form of a digital bit-stream, digitized analog signal or analog signal over a point-to-point or point-to-multipoint communication channel. Data is represented as an electromagnetic signal, such as an electrical voltage, radio-wave, microwave, or infrared signal.

DETAILED DESCRIPTION OF THE INVENTION

Figure 1:
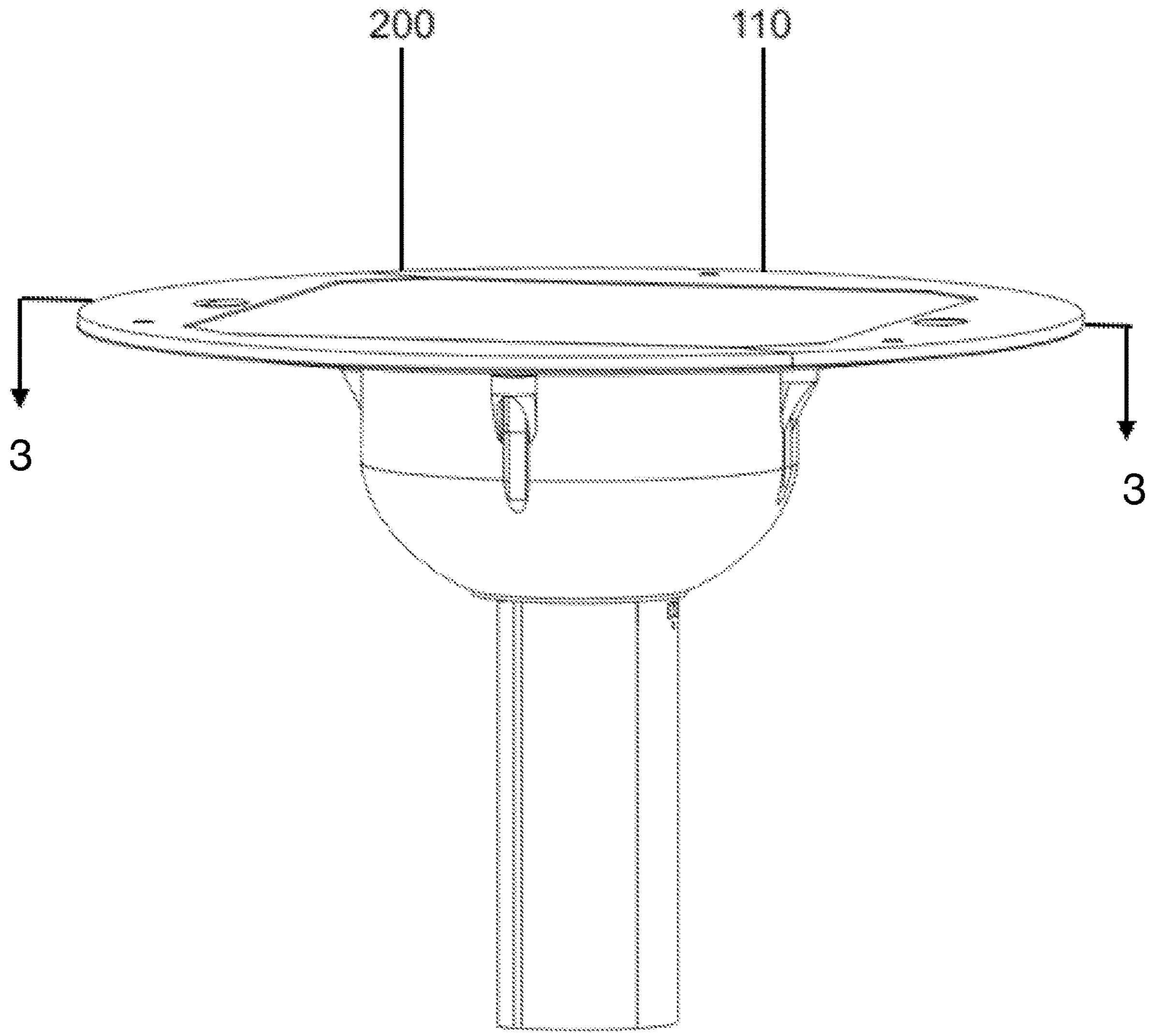
FIG. 1 shows a isometeric view of the sensor system (200)

The Wireless Pool Water Level Monitor and Water Filler (100) is a device that maintains the water level (92) in a liquid container (e.g., a pool) between predetermined limit water levels: an upper limit water level (94) and a lower limit water level (96).

The Wireless Pool Water Level Monitor and Water Filler (100) comprises two hardware elements: a sensor system (200) and a valve actuation system (400). The Wireless Pool Water Level Monitor and Water Filler (100) may further comprise a first software element: a main broker server (600). The Wireless Pool Water Level Monitor and Water Filler (100) may further comprise a second software element: a mobile app (700).

The sensor system (200) monitors the water level (92) and the temperature of the pool. The sensor system (200) communicates with the main broker server (600). The sensor system (200) transmits data to the main broker server (600). The sensor system (200) receives data from the main broker server (600). FIG. 1 shows the sensor system (200).

Figure 2:
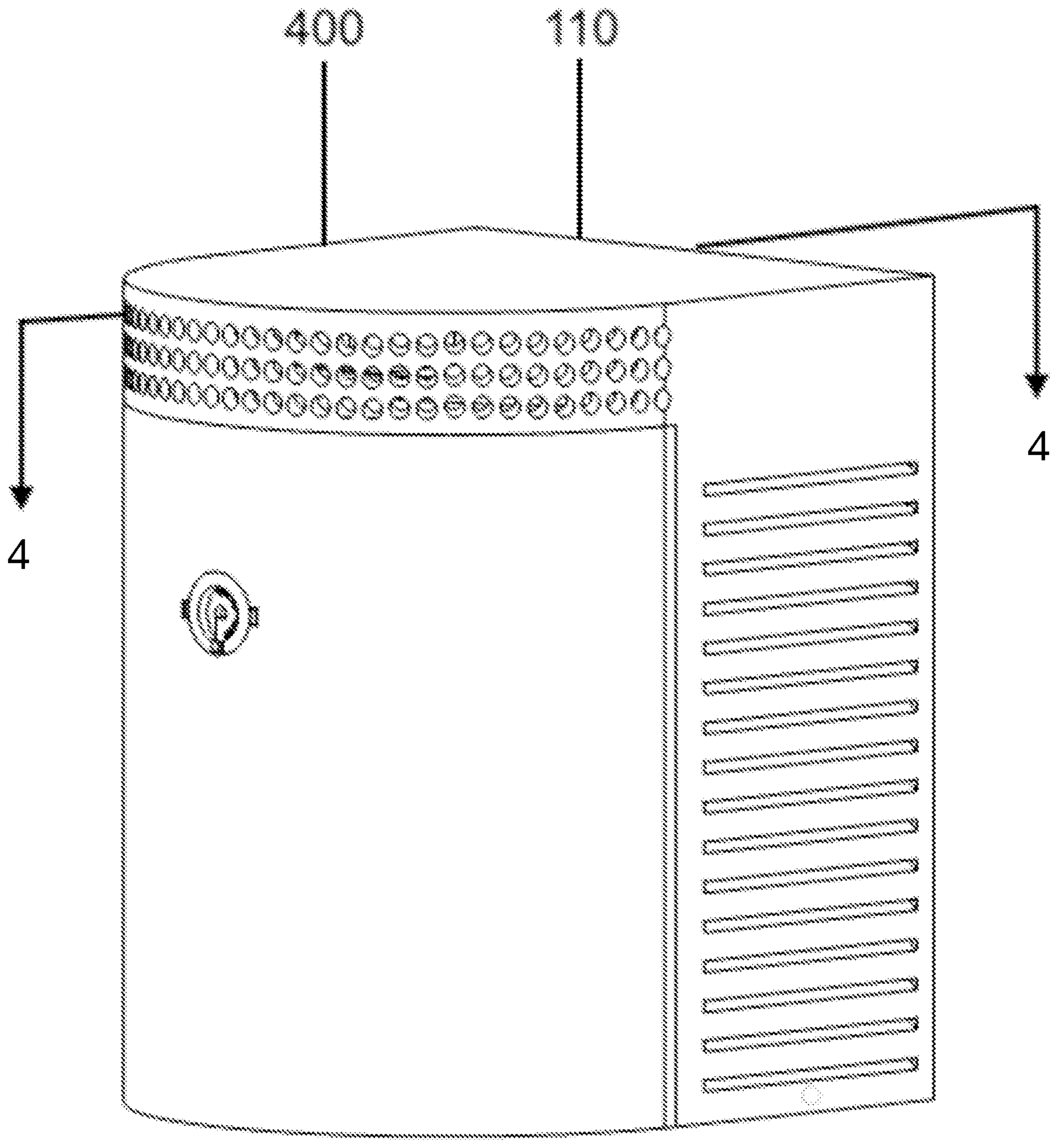
FIG. 2 shows a isometric view of the valve actuation system (400)

The valve actuation system (400) controls the water flow into the pool. The valve actuation system (400) communicates with the main broker server (600). The valve actuation system (400) transmits data to the main broker server (600). The valve actuation system (400) receives data from the main broker server (600) that is used by the valve actuation system (400) to control the water flow into the pool. FIG. 2 shows the valve actuation system (400).

The mobile app (700) allows for remote monitoring and remote controlling of the water level of the pool. The mobile app (700) communicates with the main broker server (600). The mobile app (700) receives data from the main broker server (600), allowing remote monitoring. The mobile app (700) transmits data to the main broker server (600) that is used by the valve actuation system (400) to control the water flow, allowing for remote control of the water level of the pool.

The visualization system (460) of the valve actuation system (400) communicates with the mobile app (700). The mobile app (700) receives data from the visualization system (460) of the valve actuation system (400), allowing for remote monitoring. The visualization system (460) of the valve actuation system (400) communicates with the mobile app (700) through a wireless access point (800), via wireless communication, using the Wi-Fi protocol and via the Internet.

Figure 5:
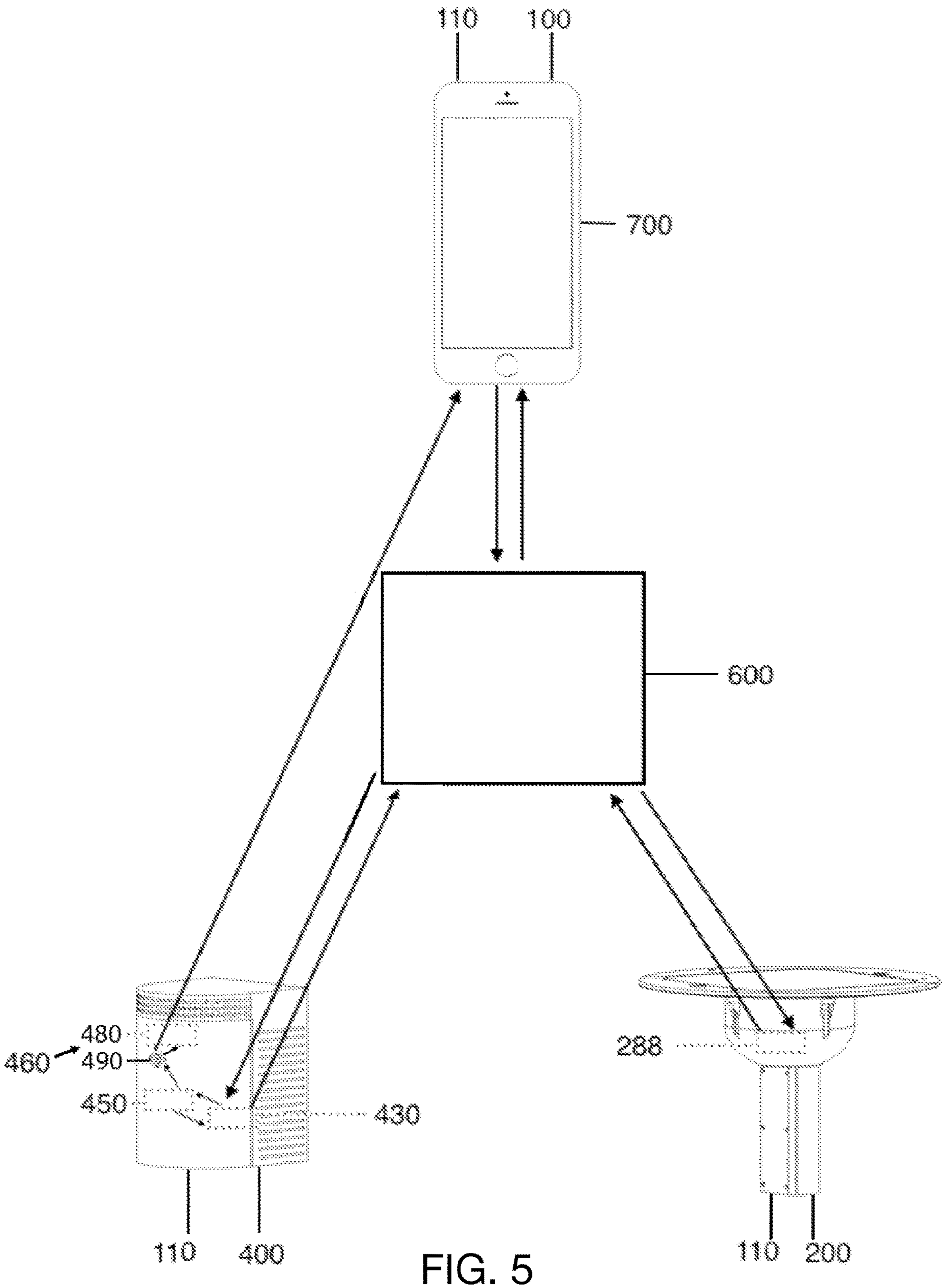
FIG. 5 shows a data communication flow chart between the remote devices (110) and the main broker server (600)

The sensor system (200), the valve actuation system (400) and the mobile app (700) are identified as remote devices (110). FIG. 5 shows a data communication flow chart between the remote devices (110) and the main broker server (600).

The main broker server (600) communicates with the remote devices (110). The main broker server (600) receives data from the remote devices (110). The main broker server (600) transmits data to the remote devices (110). The main broker server (600) serves as a data communication hub to the remote devices (110), enabling the flow of data between the remote devices (110). The main broker server (600) stores data from the remote devices (110). The main broker server (600) allows for the communication between remote devices (110) to stop or start the water flow into the pool. The main broker server (600) resides at a remote location—the Cloud—and accessed through the Internet.

The sensor system (200) and the valve actuation system (400) communicate with the main broker server (600) through a wireless access point (800), via wireless communication, using the Wi-Fi protocol and via the Internet. From the sensor system (200) and the valve actuation system (400), data is transmitted through the Internet and the wireless access point (800) to arrive at the main broker server (600). From the main broker server (600), data is transmitted through the Internet and the wireless access point (800) to the sensor system (200) and the valve actuation system (400).

The mobile app (700) communicates with the main broker server (600) through a variety of state-of-the-art mediums (wired communication, wireless communication (Wi-Fi, cellular, Bluetooth)) and the Internet, transmitting and receiving data to/from the main broker server (600).

The main broker server (600) communicates with the remote devices (110)—the sensor system (200), the valve actuation system (400), and the mobile app (700)—using a standard messaging protocol to connect and control each other (e.g., MQTT). MQTT is an OASIS standard messaging protocol for the Internet of Things (IOT). It is designed as an extremely lightweight publish/subscribe messaging transport that is ideal for connecting remote devices with a small code footprint and minimal network bandwidth. MQTT today is used in a wide variety of industries, such as automotive, manufacturing, telecommunications, and oil and gas.

1 Sensor System (200)

The sensor system (200) comprises a housing (210), a controller (220), a water level sensor unit (230), a Potentiometric System (250), a communication system (280), a power system (310), and a temperature sensor (320).

1.1 Housing (210)

The housing (210) provides physical protection by enclosing the controller (220), the water level sensor unit (230), the Potentiometric System (250), the communication system (280), the power system (310), and the temperature sensor (320).

The housing (210) is shaped to fit into the skimmer of the pool, through the top opening of the skimmer into the chamber of the skimmer. In this manner, no renovations to the pool design are needed to utilize the Wireless Pool Water Level Monitor and Water Filler (100). In one embodiment, the housing (210) is cylindrical shaped to fit cylindrical shaped top openings and chambers of the skimmer. The housing (210) maybe shaped in other shapes to fit the corresponding shape of the skimmer top opening and chamber. The housing (210) can be easily removed to clean the skimmer and does not interfere with the functioning of the skimmer.

1.2 Controller (220)

The controller (220) is a computer hardware device that is programmed to receive data, interpret data, and transmit data in response to the interpretation of the data. The controller (220) is operatively connected to the water level sensor unit (230), the Potentiometric System (250), the communication system (280), the power system (310), and the temperature sensor (320).

Figure 3:
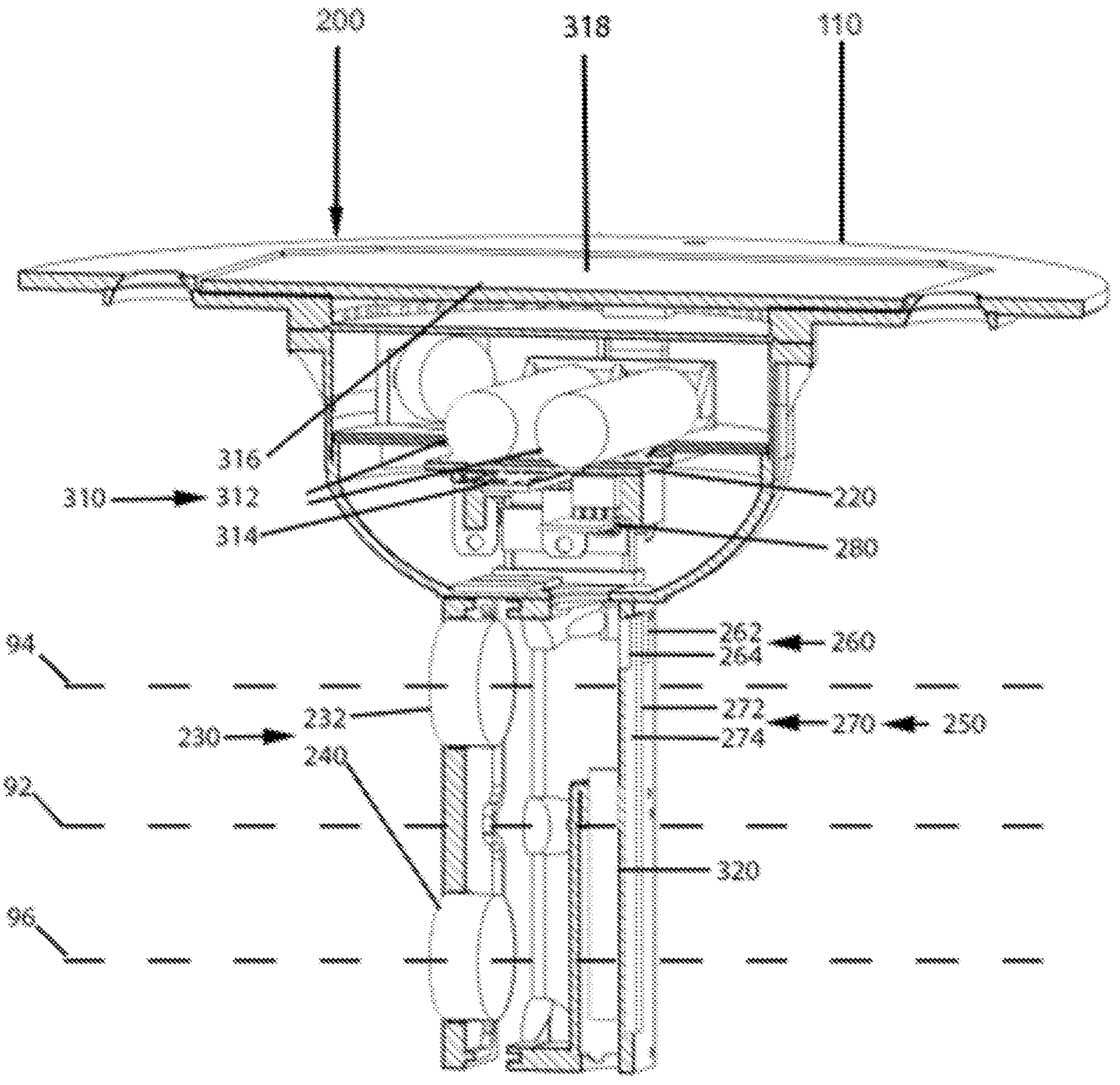
FIG. 3 is a isometric view of the sensor system (200) of FIG. 1 taken at the sectioning plane and in the direction indicated by section lines 3-3

The controller (220) communicates with the water level sensor unit (230). The controller (220) receives data from the water level sensor unit (230). The controller (220)

interprets water level sensor unit data to determine the water level of the pool. FIG. 3 shows the controller (220) within the sensor system (200).

The controller (220) communicates with the Potentiometric System (250). The controller (220) receives data from the Potentiometric System (250). The controller (220) interprets Potentiometric System data to determine the water level of the pool.

The controller (220) communicates with the temperature sensor (320). The controller (220) receives data from the temperature sensor (320). The controller (220) interprets temperature sensor data to determine the water level of the pool.

The data received by the controller (220) from the water level sensor unit (230), the Potentiometric System (250), and the temperature sensor (320) are interpreted by the controller (220) to determine the water level (92). The controller (220) uses this water level determination to identify whether the water level has reached or moved past predetermined limits, an upper limit water level (94) or a lower limit water level (96). If the controller (220) has identified that one of these states has occurred, the controller (220) determines appropriate responses and transmits data to affect these appropriate responses.

The controller (220) communicates with the communication system (280). The controller (220) receives data from the communication system (280) and transmits data to the communication system (280).

The communication system (280) of the sensor system (200) communicates with the main broker server (600).

1.3 Water Level Sensor Unit (230)

A water level sensor unit (230) measures the water level (92) of the pool and transmits data that represents the water level (92) of the pool. The data is received and interpreted by the controller (220) to identify whether the water level has reached or moved past predetermined limits: an upper limit water level (94) or a lower limit water level (96). The water level sensor unit (230) comprises an upper limit water level sensor (232) and a lower limit water level sensor (240). FIG. 3 shows the water level sensor unit (230) within the sensor system (200).

The upper limit water level sensor (232) is located above the lower limit water level sensor (240).

The use of a single sensor to identify whether the water level (92) has reached or decreased below a lower limit water level (96) has been used in combination with a timer to control water flow into the pool. Because of the variety of area and volume in pools, a single time period is not optimal for all pools. Such time period would have to be calculated for each pool size and programmed into the timer, a feature that is normally available in the device. The use of two sensors allows for standardized use in all size pools since the upper limit water level (94) and lower limit water level (96) are mostly constant.

Data from the upper limit water level sensor (232) is received and interpreted by the controller (220) to identify whether the water level (92) has reached or increased above a specified upper limit water level (94). When the upper limit water level sensor (232) transmits data that the controller (220) identifies as the water level (92) reaching a specified upper limit water level (94), the water flow into the pool needs to stop. The controller (220) transmits data to the main broker server (600) through the communication system (280) of the sensor system (200). The main broker server (600) transmits data to the mobile app (700) notifying the user that the water fill valve (420) has been closed. The main broker server (600) also transmits data to the valve actuation system (400) through the communication system (430) activating the relay (410) causing the water fill valve (420) to close and turn off the LED (470).

Data from the lower limit water level sensor (240) is received and interpreted by the controller (220) to identify whether the water level (92) has decreased below a specified lower limit water level (96). When the lower limit water level sensor (240) transmits data that the controller (220) identifies as the water level (92) reaching a specified lower limit water level (96), the water flow into the pool needs to start. The controller (220) transmits data to the main broker server (600) through the communication system (280) of the sensor system (200). The main broker server (600) transmits data to the mobile app (700) notifying the user the water fill valve (420) has been opened. The main broker server (600) also transmits data to the valve actuation system (400) through the communication system (430) activating the relay (410) causing the water fill valve (420) to open and turn on the LED (470).

The controller (220) receives and interprets data from the water level sensor unit (230) at predetermined time intervals. A preferred time interval is every two hours, but the time interval can be increased or decreased. For example, the time interval can be increased to six, twelve, or even twenty-four hours since water in a pool does not evaporate quickly, even at the height of the summer. For example, the time interval can be decreased; when the water level (92) has been identified by the controller (220) to have reached or passed the lower limit water level (96) and the water fill valve (420) opened to start the water flow to the pool, the controller (220) can receive and interpret data from the water level sensor unit (230) at shorter time intervals, for example, every 2.5 minutes, until the water level (92) has reached the upper limit water level (94). The decreased time interval prevents an over filling of the pool, especially when the water flow into the pool is significant.

The upper limit water level sensor (232) and the lower limit water level sensor (240) may utilize inductive means or conductive means to measure water level.

Inductive sensors work on the principle of change of inductance. The sensor generates an electromagnetic field with the help of the electromagnetic coil located in the head of the sensor. In operation, this means that when the detected object comes close to an inductive sensor, the so-called impedance in the coil changes. The change of this impedance depends on the distance between the detected object and the sensor. The upper limit water level sensor (232) may comprise an inductive sensor and the lower limit water level sensor (240) may comprise an inductive sensor.

Capacitance sensors work on the principle of change of capacitance. The sensor detects by means of an active capacitive field (also called dielectric). When this field changes, the sensor will detect this change. The air is in many cases the constant, when an object comes close to the sensor, the capacitive field changes. The object that passes the sensor has a higher density than air, so the sensor switches. The upper limit water level sensor (232) may comprise a capacitance sensor and the lower limit water level sensor (240) may comprise a capacitance sensor.

1.4 Potentiometric System (250)

A Potentiometric System (250) transmits data to the controller (220) that is received and interpreted by the controller (220) to determine whether the water level (92) has increased above the upper limit water level (94) or decreased below the lower limit water level (96), serving as a backup to the water level sensor unit (230). When the water level sensor unit (230) malfunctions, the Potentiometric System (250) guards against the water level (92) becoming too low and causing, for example, a motor burn out, or becoming too high and causing, for example, pool overfilling. FIG. 3 shows the Potentiometric System (250) within the sensor system (200).

The Potentiometric System (250) comprises an upper limit water level potentiometer (260) and a lower limit water level potentiometer (270). The upper limit water level potentiometer (260) comprises a positive leg (262) and a ground leg (264). The presence of a liquid between the positive leg (262) and the ground leg (264) serves as the rheostat of the upper limit water level potentiometer (260) so that the resistance measurement between the positive leg (262) and the ground leg (264) can serve as a proxy for liquid level. The lower limit water level potentiometer (270) comprises a positive leg (272) and a ground leg (274). The presence of a liquid between the positive leg (272) and the ground leg (274) serves as the rheostat of the lower limit water level potentiometer (270) so that the resistance measurement between the positive leg (272) and the ground leg (274) can serve as a proxy for liquid level.

The ground leg (264) of the upper limit water level potentiometer (260) may be integral to the ground leg (274) of the lower limit water level potentiometer (270), that is, one piece. The ground leg (264) of the upper limit water level potentiometer (260) and the ground leg (274) of the lower limit water level potentiometer (270) may be separate physical elements but electrically connected.

Figure 6:
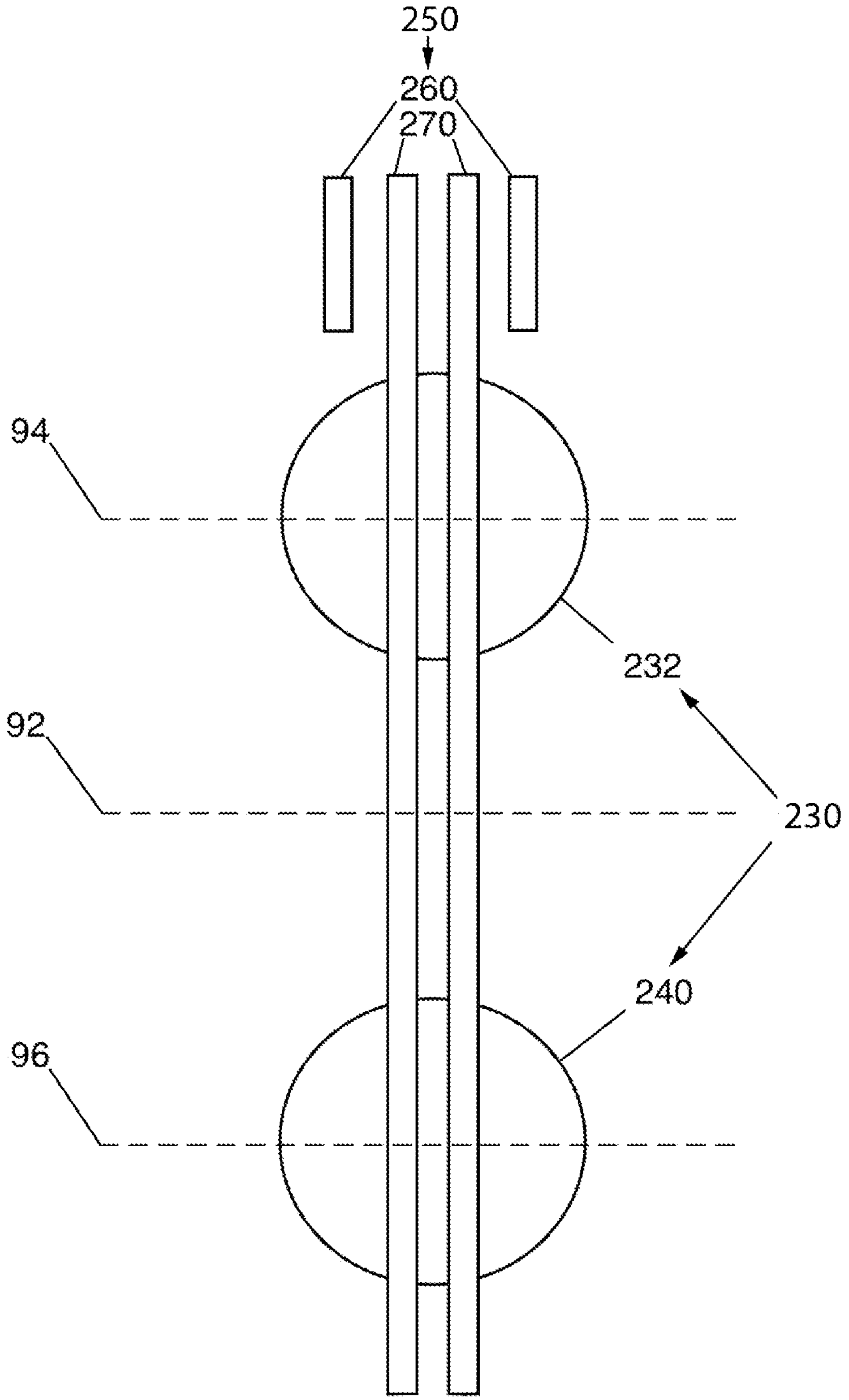
FIG. 6 shows a closeup of the Potentiometric System (250) superimposed over the Water Level Sensor Unit (230)

The upper limit water level potentiometer (260) is located above the upper limit water level (94) and the upper limit water level sensor (232). The ground leg (264) of the upper limit water level potentiometer (260) extends parallel to the positive leg (262) of the upper limit water level potentiometer (260). The upper limit water level potentiometer (260) measures infinite resistance when the water level (92) is below the upper limit water level potentiometer (260). The upper limit water level potentiometer (260) measures a non-infinite resistance when the water level (92) touches the positive leg (262) of the upper limit water level potentiometer (260). A measurement of non-infinite resistance means that the water level (92) has increased above the upper limit water level (94) and the upper limit water level sensor (232) and that the upper limit water level sensor (232) has failed. FIG. 6 show a closeup of the Potentiometric System (250) superimposed over the water level sensor unit (230). The upper limit water level potentiometer (260) is located above the upper limit water level (94) and the upper limit water level sensor (232).

The lower limit water level potentiometer (270) extends from above the lower limit water level sensor (240) to below the lower limit water level (96) and the lower limit water level sensor (240). The ground leg (274) of the lower limit water level potentiometer (270) extends parallel to the positive leg of the lower limit water level potentiometer (270). The lower limit water level potentiometer (270) measures a non-infinite resistance when the water level (92) touches the positive leg (272) of the lower limit water level potentiometer (270). The lower limit water level potentiometer (270) measures infinite resistance when the water level (92) falls below the lower limit water level potentiometer (270). A measurement of infinite resistance means that the water level (92) has fallen below the lower limit water level (96) and that the lower limit water level sensor (240) has failed. FIG. 6 show a closeup of the Potentiometric System (250) superimposed over the water level sensor unit (230). The lower limit water level potentiometer (270) extends from above the lower limit water level sensor (240) to below the lower limit water level (96) and the lower limit water level sensor (240).

As an embodiment of the Potentiometric System (250), the positive leg (262) and the ground leg (264) of the upper limit water level potentiometer (260) are shaped as rectangular segments, and the positive leg (272) and the ground leg (274) of the lower limit water level potentiometer (270) are shaped as rectangular segments.

When the controller (220) identifies that the pool water level has increased above the upper limit water level (94), the controller (220) transmits data to the main broker server (600). A notification to the mobile app (700) through the main broker server (600) is sent to notify the user that the upper limit water level sensor (232) has failed and that the valve actuation system (400) has not stopped the water flow into the pool. The user of the mobile app (700) is notified to launch the mobile app (700), activate the video stream from the pool, and attempt to stop the water flow into the pool by using the remote control provided in the mobile app (700). If this remote-control action fails to stop the water flow into the pool, further measures need to be taken to remove power to the water fill valve (420) and to run diagnostics on the Wireless Pool Water Level Monitor and Water Filler (100).

When the controller (220) identifies that the water level (92) of the pool has lowered below the lower limit water level (96), the controller (220) transmits data to the main broker server (600). A notification to the mobile app (700) through the main broker server (600) is sent to notify the user that the lower limit water level sensor (240) has failed and that the valve actuation system (400) has not started the water flow into the pool. The user of the mobile app (700) is notified to launch the mobile app (700), activate the video stream from the pool, and attempt to start the water flow into the pool by using the remote control provided in the mobile app (700). If this remote control fails to start the water flow into the pool, further measures need to be taken to fill the pool with water and to run diagnostics on the Wireless Pool Water Level Monitor and Water Filler (100).

1.5 Materials Used in the Potentiometric System (250)

When metals, especially copper, are used in water level sensor systems in a pool en-vironment, these water level sensor systems are prone to corrosion and oxidation. This corrosion af-fects the performance of these water level sensor systems leading to malfunction and erroneous water level measurements. Making use of graphite as the conductive material on the Potentiometric System (250) instead of metals such as copper, reduces the corrosive effects of water and oxidation. This use of graphite makes water level measurement more reliable and virtually maintenance free. The upper limit water level potentiometer (260) and a lower limit water level potentiometer (270) may be comprised of graphite.

The upper limit water level potentiometer (260) and a lower limit water level potentiometer (270) may be comprised of graphite or material layered over by graphite. The material may be metal or non-metal.

1.6 Communication System (280)

The communication system (280) is a hardware device that provides data communication between the sensor system (200) and a main broker server (600) through a wireless data access point (800), transmitting and receiving data. FIG. 3 shows the communication system (280) within the sensor system (200).

The communication system (280) of the sensor system (200) relies on Wi-Fi, a family of wireless network protocols, based on the IEEE 802.11 family of standards, which are commonly used for local area networking of devices and Internet access, allowing nearby digital devices to exchange data.

The use of Wi-Fi protocols is an improvement over the use of traditional proprietary RF protocols.

1. Wi-Fi enabled devices do not have to be line of site aligned.
2. Wi-Fi enabled devices are more reliable and not as effected by weather or other interference sources.
3. Wi-Fi enabled devices can be used over greater distances.
4. Wi-Fi enabled devices connected through TPC/IP networks can use the MQTT network protocol.
5. Wi-Fi has a more secure data transmission protocol.

1.7 Power System (310)

The power system (310) provides the power needed for the functioning of the sensor system (200). The power system (310) provides power to the controller (220), to the water level sensor unit (230), the Potentiometric System (250), the communication system (280), and the temperature sensor (320).

The power system (310) comprises a power storage device (312), a power controller (314), and a power source (316). The power controller (314) regulates the flow of energy in and out of the power storage device (312) and regulates the flow of energy from the power source (316) to either the power storage device (312) or the sensor system (200). FIG. 3 shows the power system (310) within the sensor system (200).

The power storage device (312) are preferably rechargeable batteries, although long term single charge batteries may also be used if the single charge batteries have enough energy and power capacity.

The power source (316) provides energy to the power storage device (312) or the sensor system (200). A preferred technology are solar cells (318). The use of solar cells (318) contained within the Wireless Pool Water Level Monitor and Water Filler (100) eliminates the need to run electrical wires to the Wireless Pool Water Level Monitor and Water Filler (100), avoiding cost, time, and the potential for short circuiting.

1.8 Temperature Sensor (320)

A temperature sensor (320) measures the water temperature of the pool and transmits this measurement as data. The temperature sensor (320) is waterproof, as it is required to be submersed into the water of the pool. FIG. 3 shows the temperature sensor (320) within the sensor system (200).

Since water conductivity is a function of temperature, water temperature is used by the controller (220) to adjust the Potentiometric System (250) data measuring the water level (92). The controller (220) processes the data from the temperature sensor (320) to adjust the data from the Potentiometric System (250) and the water level sensor unit (230).

The temperature sensor (320) data can also be used to ascertain if the water temperature of the pool is safe and prudent to swim in.

2 Valve Actuation System (400)

The valve actuation system (400) regulates the water flow into the pool to replace water that has been lost either through evaporation or water leakage. The valve actuation system (400) comprises a relay (410), a communications system (430), and a controller (450). FIG. 2 shows an isometric view of the valve actuation system (400).

The valve actuation system (400) may further comprise a visualization system (460). the valve actuation system (400) may further comprise a water fill valve (420).

Figure 7:
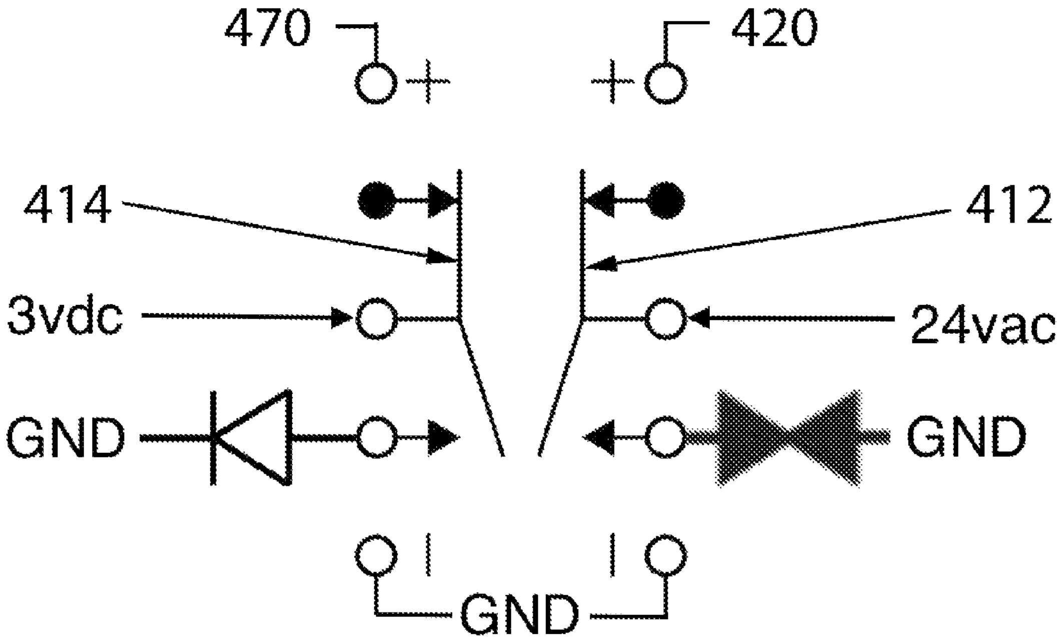
FIG. 7 shows an electric circuit diagram of the relay (410) activated to close the water fill valve (420) and turn off the LED (470)
Figure 8:
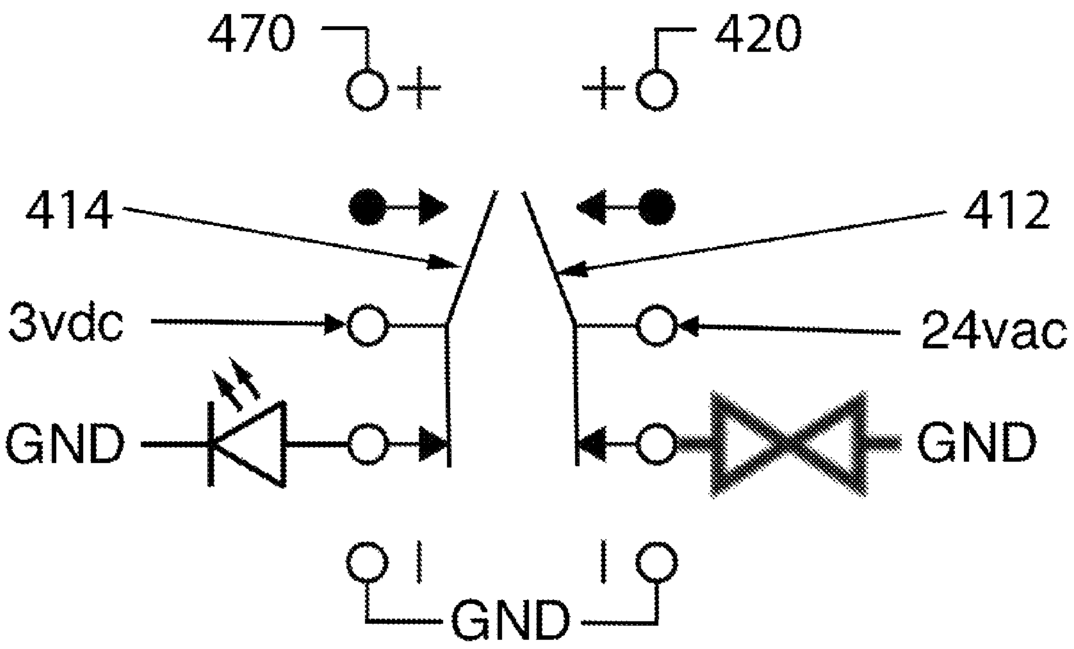
FIG. 8 shows an electric circuit diagram of the relay (410) activated to open the water fill valve (420) and turn on the LED (470)

A water fill valve (420) controls the water flow from a water source to the pool. The water fill valve (420) is activated open and closed using a relay (410). The water fill valve (420) is operatively connected to the relay (410). FIG. 8 shows an electric circuit diagram of the relay (410) with the relay activated to open the water fill valve (420) and turn on the LED (470). FIG. 7 shows an electric circuit diagram of the relay (410) with the relay activated to close the water fill valve (420) and to turn off the LED (470).

The controller (450) of the valve actuation system (400) controls the water flow into the pool by activating a relay (410) that opens and closes the water fill valve (420). The controller (450) also controls the data gathering of sensors such as the visualization system (460) and the transmittal of the gathered data to/from the mobile app (700).

The mobile app (700) sends data that the controller (450) of the valve actuation system (400) interprets to open the water fill valve (420), starting the water flow into the pool and turning on the LED (4700. The mobile app (700) can send data that the controller (450) of the valve actuation system (400) interprets to close the water fill valve (420), stopping the water flow into the pool and turning off the LED (470).

The valve actuation system (400) receives its power from a power supply (500) from a 120/240 Volt outlet which is converted to low voltage DC though the use of a transformer.

2.1 Communication System (430)

The communication system (430) of the valve actuation system (400) is a hardware device that provides data communication between the valve actuation system (400) and the main broker server (600) through the wireless access point (800), transmitting and receiving data. The communication system (430) of the valve actuation system (400) is operatively connected to the controller (450) of the valve actuation system (400). The communication system (430) of the valve actuation system (400) communicates with the main broker server (600).

The communication system (430) of the valve actuation system (400) rely on Wi-Fi, a family of wireless network protocols, based on the IEEE 802.11 family of standards, which are commonly used for local area networking of devices and Internet access, allowing nearby digital devices to exchange data.

The use of Wi-Fi protocols is an improvement over the use of traditional proprietary RF protocols.

1. Wi-Fi enabled devices do not have to be line of site aligned.
2. Wi-Fi enabled devices are more reliable and not as effected by weather or other interference sources.
3. Wi-Fi enabled devices can be used over greater distances.
4. Wi-Fi enabled devices connected through TPC/IP networks can use the MQTT network protocol.
5. Wi-Fi has a more secure data transmission protocol.

2.2 Visualization System (460)

Figure 4:
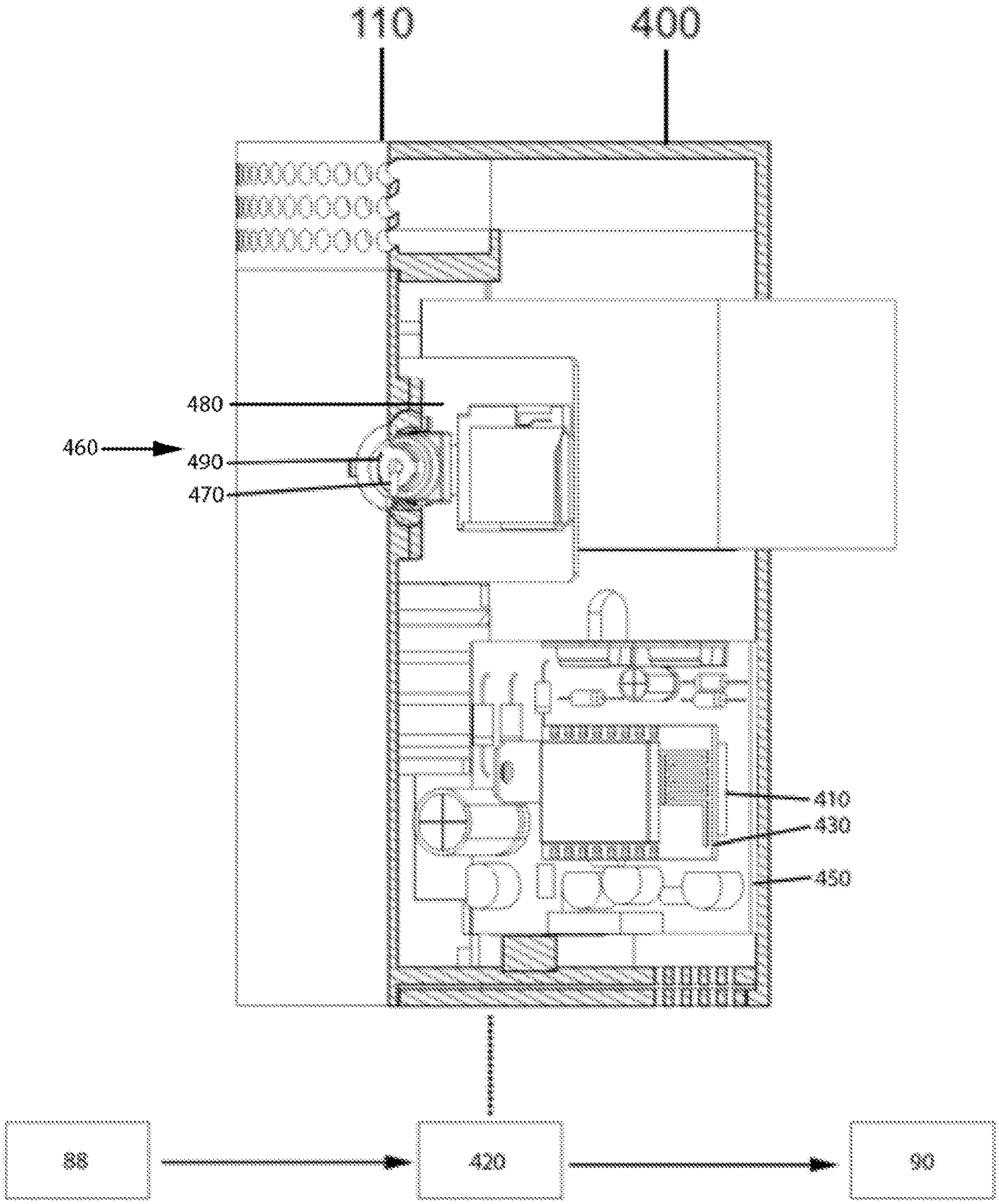
FIG. 4 is a isometric view of the valve actuation system (400) of FIG. 2 taken at the sectioning plane and in the direction indicated by section lines 4-4

The visualization system (460) provides visual confirmation of a functioning Wireless Pool Water Level Monitor and Water Filler (100). The visualization system (460) comprises a camera (490), a communication system (480), and a LED (470). The visualization system (460) is operatively connected to the controller (450) of the valve actuation system (400). FIG. 4 shows the visualization system (460) within the valve actuation system (400).

In prior art devices, a user, who is at home, can easily look out at the pool to confirm the system is preforming as expected. However, when the user is away, this form of visual confirmation is not available. The inclusion of a visualization system (460) in the Wireless Pool Water Level Monitor and Water Filler (100) allows the user with immediate visual access to their pool when interacting with the mobile app (700).

The visualization system (460) provides visual confirmation of the level of the pool water (alerting the user to start or stop the water flow to the pool with the mobile app (700)), whether the water fill valve (420) is functioning, and whether other pool equipment such as the skimmer and bottom cleaner are functioning. The visualization system (460) allows the user to check on the condition of the pool water (is it green with algae, etc.), especially useful when the user is not present at home for an extended time period. When used in conjunction with the remote-control features of the mobile app (700), the camera (490) provides visual confirmation that the action indicated through the mobile app (700) has been performed (i.e., valve open/closed) or that the alert status is correct (i.e., water level (92) dangerously low or water level (92) is too high).

The camera (490) generates data representing images, video streaming, and/or video files. The camera (490) is operatively connected to the communication system (480) of the visualization system (460). The communication system (480) provides a data link between the camera (490) and the mobile app (700) through the wireless access point (800) and the Internet, transmitting and receiving data, such as video stream.

Due to security concerns, the camera (490) communicates data only at certain times. When the mobile app (700) is launched, a signal is sent to the main broker server (600) which communicates with the communication system (430) of the valve actuation system (400) to activate the camera (490). The controller (450) receives the signal from the communication system (430), activating the camera (490). When the camera (490) is activated, the communication system (480) of the visualization system (460) broadcasts the IP address of the camera (490) to the Internet through the wireless access point (800). The communication system (480) subsequently broadcasts data such as a video stream to the mobile app (700).

Once the mobile app (700) is launched, the mobile app (700) will display a button which if tapped, will initiate an internet search for the IP address of the camera (490). Once the mobile app (700) acquires the IP address of the camera (490), the data transmitted from the camera (490) can be displayed in the mobile app (700).

When the mobile app (700) is closed, the camera (490) stops communicating data through a similar process. When the mobile app (700) is closed, a signal is sent to the main broker server (600), which communicates with the communication system (430) of the valve actuation system (400) for the camera (490) to stop communicating data. The controller (450) receives the signal from the communication system (430), stopping the camera (490) from communicating data. When the camera (490) stops communicating data, the camera (490) stops broadcasting its IP address to the Internet.

2.3 LED (470)

The LED (470) provides visual confirmation of the state of the relay (410) and the water flow to the pool.

The LED (470) is turned on when the relay (410) from the valve actuation system (400) is activated to open the water fill valve (420) to start the water flow into the pool. The LED (470) is turned off when the relay (410) from the valve actuation system (400) is activated to close the water fill valve (420) and stop the water flow into the pool.

The LED (470) is positioned so that it is viewed by the camera (490) of the visualization system (460). In this manner, the user can check the status of the LED (470) via the mobile app (700). The LED status serves as a confirmation back up to the notifications being received from the main broker server (600) through the mobile app (700).

When the user receives a notification that the water fill valve (420) is open and water flows into the pool, the user can verify this event by looking at the camera video being transmitted through the mobile app (700) and verify that the LED (470) is turned on. When the user receives a notification that the water fill valve (420) is closed and water does not flow into the pool, the user can verify this event by looking at the camera video being transmitted through the mobile app (700) and verify that the LED (470) is turned off.

For example, when the main broker server (600) receives a signal from the mobile app (700) to start introducing water into the pool or from the water level sensor unit (230) indicating that the water level is at the lower limit water level (96), the main broker server (600) transmits a signal to the communication system (430) of the valve actuation system (400). The communication system (430) transmits a signal to the controller (450), which then sends a signal to the relay (410). The relay (410) is activated closing a first contact (412) that is operatively connected to the water fill valve (420) that opens the water fill valve (420), introducing water into the pool. When the relay (410) is activated, the relay also closes a second contact (414) that is operatively connected to the LED (470) turning on the LED (470). This provides visual confirmation that the valve actuation system (400) has received the signal and the water fill valve (420) is open. The user need only open the mobile app (700) and connect to the camera (490) to see the LED (470) turned on. FIG. 8 shows an electric circuit diagram of the relay (410) with the relay activated to open the water fill valve (420) and to turn on the LED (470).

Conversely, when the main broker server (600) receives a signal from the mobile app (700) to stop introducing water into the pool and closing the water fill valve (420), the main broker server (600) transmits a signal to the communication system (430) of the valve actuation system (400). The communication system (430) transmits a signal to the controller (450), which then sends a signal to the relay (410). The relay (410) is activated opening the first contact (412) that closes the water fill valve (420), stopping the introduction of water into the pool. When the relay (410) is activated, the relay also opens the second contact (414) turning off the LED (470). This provides visual confirmation that the valve actuation system (400) has received the signal sent and the water fill valve (420) is closed. The user need only open the mobile app (700) and connect to the camera (490) to see the LED (470) turned off. FIG. 7 shows an electric circuit diagram of the relay (410) with the relay activated to close the water fill valve (420) and turn off the LED (470).

3 Main Broker Server (600)

The main broker server (600) communicates with the remote devices (110). The main broker server (600) receives data from the remote devices (110). The main broker server (600) transmits data to the remote devices (110). The main broker server (600) stores data from the remote devices (110). The main broker server (600) resides at a remote location—the cloud—and is accessed through the Internet. FIG. 5 shows the data communication flow between the remote devices (110) and the main broker server (600).

The main broker server (600) stores some of the data received from the communication system (280) of the sensor system (200) and the communication system (430) of the valve actuation system (400). The stored sensing data can be distributed to the other remote devices (110) of the Wireless Pool Water Level Monitor and Water Filler (100). For example, the mobile app (700) would be able to access the data stored in the main broker server (600).

The main broker server (600) receives data from the sensor system (200) indicating if the water level (92) has increased above the upper limit water level (94) or has decreased below the lower limit water level (96).

The main broker server (600) receives data from the valve actuation system (400) indicating that the water fill valve (420) has started or stopped the introduction of water into the pool. This data is sent from the main broker server (600) to the mobile app (700) so that the user can confirm that the water fill valve (420) has started or stopped the introduction of water into the pool.

The main broker server (600) receives data from the mobile app (700) indicating that the water fill valve (420) needs to be opened or closed.

4 Mobile App (700)

The mobile app (700) communicates with the main broker server (600). The mobile app (700) receives data from the main broker server (600), allowing for remote monitoring. The mobile app (700) transmits data to the main broker server (600) that the main broker server (600) relays to the valve actuation system (400). With this data, the valve actuation system (400) controls the water flow into the pool, allowing for remote controlling of the water level (92). FIG. 5 shows the data communication flow between the remote devices (110), including the mobile app (700), and the main broker server (600).

The mobile app (700) communicates with the Internet through a variety of state of the art mediums (e.g., wired communication, wireless communication—Wi-Fi, cellular, Bluetooth), transmitting data to the main broker server (600) and receiving data from the main broker server (600).

The mobile app (700) can receive a notification when the pool level has reached an upper limit water level (94) or a lower limit water level (96). The mobile app (700) can receive a notification when the valve actuation system (400) has opened the water fill valve (420) to allow water into the pool and turn on the LED (470) or when the valve actuation system (400) has closed the water fill valve (420) to shut off the water into the pool and turn off the LED (470). The mobile app (700) can receive a notification when the Potentiometric System (250) has detected that the water level (92) has lowered past a lower limit water level (96) or that the pools' water level has increased above an upper limit water level (94), signifying a failure in the water level sensor unit (250). The mobile app (700) can receive data (e.g., images, streaming video, video files) from the camera (490) of the valve actuation system (400).

The mobile app (700) can send data that the controller (450) of the valve actuation system (400) interprets to open the water fill valve (420), allowing the water flow into the pool and turning on the LED (470). The mobile app (700) can send data that the controller (450) of the valve actuation system (400) interprets to close the water fill valve (420), stopping the water flow into the pool and turning off the LED (470).

5 Summary of States

There are eight states that the Wireless Pool Water Level Monitor and Water Filler (100) can find itself in.

State One: The water fill valve (420) is closed so no water flows into the pool. Every two hours, the sensor system (200) takes readings from the lower limit water level sensor (240), the upper limit water level potentiometer (260), the lower limit water level potentiometer (270), and the temperature sensor (320). The controller (220) determines if the lower limit water level (96) has been reached. If not, the controller (220) transmits the data to the main broker server (600) through the communication system (280) where the data is stored. The sensor system (200) continues to take readings every two hours.

State Two: The water fill valve (420) is closed so no water flow into the pool. Every two hours, the sensor system (200) takes readings from the lower limit water level sensor (240), the upper limit water level potentiometer (260), the lower limit water level potentiometer (270), and the temperature sensor (320). The controller (220) determines if the lower limit water level (96) has been reached. If yes, the controller (220) stores the lower limit water level potentiometer data and transmits the data to the main broker server (600) through the communication system (480) where it is stored. The sensor system (200) starts taking readings from the sensors every 2.5 minutes. The main broker server (600) sends a notification to the mobile app (700) informing the user the pool has started filling and transmits data to the valve actuation system (400) through the communication system (480) activating the relay (410) and opening the water fill valve (420) and turning on the LED (470).

State Three: The next time—two and a half minutes later—the sensor system takes readings from the upper limit water level sensor (232), the upper limit water level potentiometer (260), the lower limit water level potentiometer (270), and the temperature sensor (320). The controller (220) compares the current lower limit water level potentiometer reading with the stored one. If the current reading is above the previous one by a margin of error the controller (220) determines the valve was opened and transmits the data to the main broker server (600) through the communication system (480) where the data is recorded. The sensor system continues to take readings from the upper limit water level sensor (232), the upper limit water level potentiometer (260), the lower limit water level potentiometer (270), and the temperature sensor (320) every 2.5 minutes without comparing the current and stored lower limit water level potentiometer readings. If however the current lower limit water level potentiometer reading is not higher than the stored one, the controller (220) transmits data to the main broker server (600) consistent with a lower limit water level reading causing to repeat an attempt to open the water fill valve (420). This condition may occur if the valve actuation system (400) is temporarily offline. The user will receive two or more notifications the pool has started filling, alerting the user to a potential problem.

State Four: The water fill valve (420) is closed so no water flows into the pool. Every two hours, the sensor system takes readings from the lower limit water level sensor (240), the upper limit water level potentiometer (260), the lower limit water level potentiometer (270), and the temperature sensor (320). The controller (220) determines if the lower limit water level (96) has been reached. If not, the controller (220) transmits the data to the main broker server (600) through the communication system (480) where it is stored. If the lower limit water level potentiometer reading is the equivalent of an open circuit (i.e., infinite), the main broker server (600) transmits a notification to the mobile app (700) informing the user that the lower limit water level sensor (240) has failed and that the valve actuation system (400) has not opened the flow of water into the pool. The user of the mobile app (700) is advised to launch the mobile app (700), activate the video stream from the pool, and attempt to open the flow of water into the pool by using the remote control provided in the mobile app (700). If this remote control fails to open the flow of water into the pool, further measures need to be taken to fill the pool with water and to run diagnostics on the Wireless Pool Water Level Monitor and Water Filler (100).

State Five: The water fill valve (420) is open so water flows into the pool. Every 2.5 minutes the sensor system takes readings from the upper limit water level sensor (232), the upper limit water level potentiometer (260), the lower limit water level potentiometer (270), and the temperature sensor (320). The controller (220) determines if the upper limit water level (94) has been reached. If not the controller (220) transmits the data to the main broker server (600) through the communication system (480) where it is stored. The sensor system continues taking readings from the sensor every 2.5 minutes.

State Six: The water fill valve (420) is open so water flows into the pool. Every 2.5 minutes the sensor system takes readings from the upper limit water level sensor (232), the upper limit water level potentiometer (260), the lower limit water level potentiometer (270), and the temperature sensor (320). The controller (220) determines if the upper limit water level (94) has been reached. If the upper limit water level (94) has been reached, the controller (220) stores the lower limit water level potentiometer reading and transmits the data to the main broker server (600) through the communication system (480) where it is stored. The sensor system continues taking readings from the sensor every 2.5 minutes. The main broker server (600) sends a notification to the mobile app (700) informing the user the pool has stopped filling and transmits data to the valve actuation system (400) through the communication system (480) deactivating the relay (410) and closing the water fill valve (420) and turning off the LED (470).

State Seven: The next time—2.5 minutes later—the sensor system takes the readings of the lower limit water level sensor (240), the upper limit water level potentiometer (260), the lower limit water level potentiometer (270) and the temperature sensor (320). The controller (220) compares the current lower limit water level potentiometer reading with the stored one. If the current reading is no larger than the stored one within a margin of error, the controller (220) determines the water has stopped flowing, transmits the data to the main broker server (600) through the communication system (480) where it is stored. The controller (220) starts checking the sensor readings every two hours and stops comparing current and stored lower limit water level potentiometer readings. If however, the current lower limit water level potentiometer reading is above the saved one within a margin of error the controller (220) determines the valve has not been closed and transmits to the main broker server (600) through the communication system (480) data consistent with an upper limit water level reading causing another attempt to close the valve. This condition may occur if the valve actuation system (400) is temporarily offline. The user will receive two or more notifications the pool has stopped filling alerting them to a potential problem.

State Eight: The water fill valve (420) is open so water flows into the pool. Every two and one half minutes the sensor system takes readings from the lower limit water level sensor (240), the upper limit water level potentiometer (260), the lower limit water level potentiometer (270), and the temperature sensor (320). The controller (220) determines if the lower limit water level (96) has been reached. If not, the controller (220) transmits the data to the main broker server (600) through the communication system (480) where it is stored. If the upper limit water level potentiometer reading is consistent with a closed circuit (non-infinite), the main broker server (600) transmits a notification to the mobile app (700) informing the user that the upper limit water level sensor (232) has failed and that the valve actuation system (400) has not stopped the flow of water into the pool. The user of the mobile app (700) is advised to launch the mobile app (700), activate the video stream from the pool, and attempt to stop the flow of water into the pool by using the remote control provided in the mobile app (700). If this remote control fails to stop the flow of water into the pool, further measures need to be taken to stop the flow of water and to run diagnostics on the Wireless Pool Water Level Monitor and Water Filler (100).

6 Clarifying Comments

While the foregoing written description of the invention enables a person having ordinary skill in the art to make and use what is considered presently to be the best mode thereof, those of ordinary skill in the art will understand and appreciate the existence of variations, combinations, and equivalents of the specific embodiment, process, and examples herein. The invention should therefore not be limited by the above-described embodiment, process, and examples, but by all embodiments and processes within the scope and spirit of the invention.

The inventions shown and described herein may be used to address one or more of such problems or other problems not set out herein and/or which are only understood or appreciated at a later time. The future may also bring to light currently unknown or unrecognized benefits which may be appreciated, or more fully appreciated, in association with the inventions shown and described herein. The desires and expected benefits explained herein are not admissions that others have recog-nized such prior needs, since invention and discovery are both inventive under the law and may relate to the inventions described herein.

SEQUENCE LISTING

Not Applicable

I claim:

1. A wireless pool water level monitor and water filler device that maintains a water level of a pool between an upper limit water level and a lower limit water level, the wireless pool water level monitor and water filler device comprising:

(a) a sensor system, the sensor system comprising:
  (i) a housing;
  (ii) a controller;
  (iii) a water level sensor unit, the water level sensor unit comprising:
    (1) an upper limit water level sensor, where the upper limit water level sensor identifies when the water level of the pool reaches the upper limit water level; and
    (2) a lower limit water level sensor, where the lower limit water level sensor identifies when the water level of the pool reaches the lower limit water level;
    (3) where the upper limit water level sensor is located above the lower limit water level sensor,
  (iv) a potentiometric system, the potentiometric system comprising:
    (1) an upper limit water level potentiometer, the upper limit water level potentiometer comprising: a positive leg and a negative leg;
    (2) a lower limit water level potentiometer, the lower limit water level potentiometer comprising: a positive leg and a negative leg;

(3) where the upper limit water level potentiometer identifies when the water level of the pool has increased above the upper limit water level,
(4) where the lower limit water level potentiometer identifies when the water level of the pool has decreased below the lower limit water level,
(5) where the upper limit water level potentiometer is located above the upper limit water level and the upper limit water level sensor,
(6) where the lower limit water level potentiometer extends from above the upper limit water level sensor to below the lower limit water level and the lower limit water level sensor,
(v) a communication system;
(vi) a power system; the power system comprising:
(1) a power source;
(2) a power controller;
(3) a power storage device; and
(vii) a temperature sensor;
(viii) where the controller of the sensor system is operatively connected to the water level sensor unit, the potentiometric system, the communication system of the sensor system, the power system, and the temperature sensor,
(b) a valve actuation system, the valve actuation system comprising:
(i) a relay;
(ii) a controller;
(iii) a communication system;
(iv) where the controller of the valve actuation system is operatively connected to the communication system of the valve actuation system.

2. The wireless pool water level monitor and water filler device described in claim 1,
(a) wherein the valve actuation system further comprises a visualization system, the visualization system comprising:
(i) a camera;
(ii) a communication system; and
(iii) a LED;
(iv) where the LED is positioned so that it is viewed by the camera of the visualization system,
(v) where the camera is operatively connected to the communication system of the visualization system,
(vi) where the communication system of the visualization system communicates with the mobile app,
(vii) where the visualization system is operatively connected to the controller of the valve actuation system.

3. The wireless pool water level monitor and water filler device described in claim 2,
(a) wherein the valve actuation system, the relay comprising: a first contact and a second contact,
(b) where the first contact is activated open when the second contact is activated open;
(c) where the first contact is activated closed when the second contact is activated closed;
(d) where the first contact is operatively connected to the LED,
(e) where the second contact is operatively connected to a water fill valve.

4. The wireless pool water level monitor and water filler device described in claim 2,
(a) wherein the positive leg and the negative leg of the upper limit water level potentiometer are made from a metal and a graphite;
(b) wherein the positive leg and the negative leg of the lower limit water level potentiometer are made from the metal and the graphite;
(c) where the graphite of the upper limit water level potentiometer layers over the metal;
(d) where the graphite of the lower limit water level potentiometer layers over the metal.

5. The wireless pool water level monitor and water filler device described in claim 2,
(a) wherein the upper limit water level potentiometer is made from graphite;
(b) wherein the lower limit water level potentiometer is made from graphite.

6. The wireless pool water level monitor and water filler device described in claim 2,
(a) wherein the positive leg and the negative leg of upper limit water level potentiometer are shaped as rectangular segments;
(b) wherein the positive leg and the negative leg of lower limit water level potentiometer are shaped as rectangular segments.

7. The wireless pool water level monitor and water filler device in claim 2,
(a) wherein the valve actuation system further comprising a water fill valve;
(b) where the water fill valve is operatively connected to the relay.

8. The wireless pool water level monitor and water filler device described in claim 1, further comprising:
(a) a main broker server;
(b) a mobile app;
(c) where the communication system of the valve actuation system communicates with the main broker server,
(d) where the communication system of the water level sensor unit communicates with the main broker server,
(e) where the mobile app communicates with the main broker server.

9. The wireless pool water level monitor and water filler device described in claim 8,
(a) wherein the valve actuation system further comprises a visualization system, the visualization system comprising:
(i) a camera;
(ii) a communication system; and
(iii) a LED;
(iv) where the LED is positioned so that it is viewed by the camera of the visualization system,
(v) where the camera is operatively connected to the communication system of the visualization system,
(vi) where the communication system of the visualization system communicates with the mobile app,
(vii) where the visualization system is operatively connected to the controller of the valve actuation system.

10. The wireless pool water level monitor and water filler device described in claim 9,
(a) wherein the positive leg and the negative leg of the upper limit water level potentiometer are made from a metal and a graphite;
(b) wherein the positive leg and the negative leg of the lower limit water level potentiometer are made from the metal and the graphite;
(c) where the graphite of the upper limit water level potentiometer layers over the metal;
(d) where the graphite of the lower limit water level potentiometer layers over the metal.

11. The wireless pool water level monitor and water filler device described in claim 9, (a) wherein the upper limit water level potentiometer is made from graphite;

(b) wherein the lower limit water level potentiometer is made from graphite.

12. The wireless pool water level monitor and water filler device described in claim 11, (a) wherein the valve actuation system further comprising a water fill valve;

(b) where the water fill valve is operatively connected to the relay.

13. The wireless pool water level monitor and water filler device described in claim 11, (a) wherein the valve actuation system, the relay comprising: a first contact and a second contact, (b) where the first contact is activated open when the second contact is activated open;

(c) where the first contact is activated close when the second contact is activated closed;

(d) where the first contact is operatively connected to the LED, (e) where the second contact is operatively connected to the water fill valve.

14. The wireless pool water level monitor and water filler device described in claim 9, (a) wherein the positive leg and the negative leg of the upper limit water level potentiometer are shaped as rectangular segments;

(b) wherein the positive leg and the negative leg of the lower limit water level potentiometer are shaped as rectangular segments.

* * * * *